3,281,322
METHODS FOR CONTROLLING AND TREATING
RENAL CALCULI
Harvey Ashmead, 719 East Center, Kaysville, Utah, and
Floyd R. Mencimer, 3424 Iowa Ave., Ogden, Utah
No Drawing. Filed Sept. 11, 1961, Ser. No. 136,997
The portion of the term of the patent subsequent to
May 18, 1982, has been disclaimed
10 Claims. (Cl. 167—55)

This invention pertains to the use of two or more complexing agents in combination for their synergistic, additive or protective effect with each other to accomplish the removal of cation and/or cation compounds from the body of all classes of animals and to effect a favorable influence on the crystaloidal and colloidal systems of the body of animals. The present invention is a continuation-in-part of our co-pending application, Ser. No. 92,147, filed February 28, 1961, for Animal Feed Supplements, now Patent 3,184,381.

Heretofore it has been virtually impossible to cause the assimilation of complexing agents such as chelating agents by animals or humans through the digestive system. The problem is multifold in scope with many factors to overcome, i.e. hydrolizing of sequesterants into their inactive ortho form as in phosphates; complexing of cations and elimination in the feces; and in general the rejection of such complexing agents by the selective action of the cells in the lining of the gut.

The presence of these aberrant cations in the systems of animals has caused many well known ailments such as renal calculi.

Up to the present time, treatment of this condition has not been too successful and in most cases involves the necessity of operations for the removal of these deposits or other painful procedures.

The present invention makes possible the treatment of these deposits without the necessity of operation or painful procedures. This is accomplished by administering a novel composition orally which appears to allow the absorption of chelates in their active form into the systems of animals. These chelates then complex the undesirable cations in these deposits, causing their dissolution.

Therefore, it is an object of the present invention to provide a process whereby complexing agents can be absorbed into the systems of animals.

Another object is to provide a novel composition for the prevention and treatment of undesirable aberrant cations or cation compounds in the bodies of animals which may be administered orally or parenterally.

Another object is to provide a composition for the treatment of all undesirable types of calcific deposits in the bodies of animals.

A further object is to provide a composition whereby a chelate in its active form may be absorbed into the systems of animals when administered orally.

Another objective is to provide a composition which will favorably effect the colloidal and crystalloidal systems in the blood and urine.

A further objective is to provide a composition which will aid in the drug utilization by animals.

Other objectives and advantages will in part be obvious and in part appear hereinafter.

We have found that, by administering two or more complexing substances in combination or by administering one and subsequently another or more of such substances, we can prevent accumulation of undesirable cation and/or cation compounds and remove aberrant cations and/or cation compounds deposited in animal bodies including warm-blooded mammals.

This phenomena results from the fact that one of the complexing agents combines with cations within the gut, thus limiting absorption of these cations by the animal. This cation then apparently allows the other complexing agent or agents to be absorbed into the circulatory system in their active form capable of complexing undesirable cation or cation compounds within the body.

For example it has been found that an excess mole equivalent of one of the complexing agents over the mole equivalent cations in the gut (food or fluid intake) leads to the absorption of the other complexing agent to accomplishing the final objective of cation or cation compound dissolution.

In this manner, they are capable of complexing undesirable cations or cation compounds within the body or in the urinary tract. Because of their peptizing and deflocculent properties, these agents also favorably effect the colloidal and crystalloidal systems in the blood and urine to prevent the forming of undesirable precipitates, aggregates, or acretions. In some instances of urinary diseases, it has been found expedient to regulate the pH of the urine to conform with the pH of the particular complexing agent or agents employed to take advantage of their most active form.

Occasionally, we have found it desirable to regulate the daily intake of cations and/or cation compounds by altering the diet of animals, thus reducing the amount of agent required to bind these cations in the gut and increase the available amount of free agent for the circulatory system and subsequently the urine.

By utilizing these processes, then, undesirable compounds are eliminated in a soluble or colloidal form.

The preferred method of application is oral administration of the complexing agents; however, all or part may be given in tablet, capsule, mixed in food or water, drenched or gavaged, parenterally or, at times, intravenously.

The dosage range which may be used in all classes of animals employed in the above-described combination is 1 mg./kilogram body weight/day to 1 gram/kilogram body weight/day and as based on the relative mol-equivalent weight of the compounds and their comparable complexing and/or ion exchange power.

More specifically, examples of complexing or ion exchange substances which can be used in combination of two or more components, but not necessarily limiting this invention to these materials, are:

EDTA
Na dihydroxyethyl glycine 50% aq.
Hydroxyethyl ethylene diamine triacetic acid
Trisodium hydroxy ethyl ethylene diamine triacetate 41% aq.
Pentasodium diethylene triamine pentaacetate
1,2-diaminocyclohexane tetra acetic acid
Nitrilotriacetic acid
Na hexametapyrophosphate 2 hydroxymethyl-5 hydroxy-rr-pyrone
Mono, di, tri, and tetra Na salt of EDTA
Polyethylene glycol chain
N,N,N,N'-tetrakis (2 hydroxypropyl) ethylene diamine
Tetra Na and K pyrophosphate ($Na_4P_2O_7$) and ($K_4P_2O_7$)
Na tripolyphosphate
N,N Di (2 hydroxyethyl) glycine
Diethylene triamine pentaacetic acid
Calcium ethylene diamine tetraacetic acid
S.Q. Phosphate (Trademark for a glassy polyphosphate with high calcium sequestering properties)
Sodium acid pyrophosphate We may also use with or in place of, one of these chelates an ion exchange substance selected for its non-toxicity such as:

N-vinyl-5-methyl-2-oxazolidinone
Copolymer-N-vinyl-5-methyl-2 oxazolidinone
Carboxylic acid resin
Inorganic Na alumino silicate gel
Polystyrene matrix having nuclear sulfonic acid group as functional group
Hydrocarbon matrix having phosphonic acid as functional group
Styrene divinyl benzene copolymers with sulfonic acid functional groups
Styrene divinyl benzene copolymers with quaternary ammonia as a functional group
Styrene-divinyl benzene matrix with polyalkylamine as a functional group We may also use two chelating agents, that is, provided one is complexed with a cation. In this case the cation which would be desirable within the animal's system would be in the complexed form. The uncomplexed chelate then would complex cations in the digestive tract, thus favoring assimilation of the complexed chelate. The true meaning and scope of this invention, however, is intended to include all non-toxic combinations of two or more complexing substances for their effect on aberrant cation or cation compound deposits in the animal's body (including warm-blooded mammals), or the prevention of such formation by employing these combinations in a synergistic, additive or protective action with each other when in combination.

When one of the chelates is replaced by an ion exchange resin, the ion exchange resin must be free, that is, it must not be complexed with a cation as in this case the ion exchange resin is then the component of the two component system which will tie up cations in the digestive tract, leaving the chelate free to be absorbed into the circulatory system.

Comparative tests showing the complexing action of urine when 1, 2, and 3 components are administered to both animals and men.

CHELATION OR COMPLEXING ACTION OF URINE

*Object.*—To check normal chelation or complexing action of urine and then orally medicate with agents listed below and subsequently check the same animal's new chelation or complexing action of the urine, if any.

A. Chelators (used):
EDTA (ethylendiaminetetraacetic acid)
DTPA (diethylenetriaminepentaacetic acid)
Versonal (N-hydroxyethylenediaminetriacetic acid)
CaEDTA (calcium ethylenediaminetetraacetic acid)
Sodium Tripolyphosphate
S.Q. Phosphate
Sodium hexametaphosphate
Sodium acid pyrophosphate
B. Colloidal Gums (used):
Sodium carboxymethyl cellulose
C. Chelating resins (none).

*Number of experiments—animals and man—*Eighty three

CROSS SECTION OF AVERAGE RESULTS

| Complexing agent or agents administered by mouth | Pre-medication complexing value of urine | 2-4 hours post-medication complexing value of urine | Evaluation |
|---|---|---|---|
| One component: | | | |
| 1. 8 gms. EDTA | .32 | .15 | None. |
| 2. 8 gms. sod. tripolphosphate. | .30 | .59 | Poor. |
| 3. 8 gms. sod. carboxymethyl cellulose. | .26 | .23 | None. |
| 4. 8 gms. sod. Hexametaphosphate. | .08 | .09 | Do. |
| 5. 8 gms. Versonal | .30 | .40 | Do. |
| 6. 8 gms. S.Q. Phosphate | .08 | .40 | Fair. |
| 7. 8 gms. sod. acid pyrophosphate. | .34 | .40 | None. |
| 8. 4 gms. CaEDTA | .25 | .27 | Do. |
| 9. 4 gms. DTPA | .47 | .15 | Do. |
| Three components: | | | |
| 10. 4 gms. EDTA, 8 gms. sod. tripoly, 8 gms. Sod. Carboxymethyl Cellulose. | .06 | 1.25 | Very good. |
| 11. 4 gms. Versonol, 8 gms. Sod. Tripoly, 8 gms. Sod. Carboxymethyl Cellulose. | .24 | .50 | Fair. |
| Two components: | | | |
| 12. 4 gms. DTPA, 8 gms. Sod. Tripoly Ph. | .60 | 2.20 | Very good. |
| 13. 4 gms. EDTA, 8 gms. S.Q. Phosphate. | .20 | .40 | Fair. |
| 14. 4 gms. EDTA, 8 gms. Sod. Hexameta. | .16 | .20 | Poor. |
| 15. 4 gms. Versonol, 8 gms. Sod. Hexameta. | .18 | 1.80 | Very good. |
| 16. 4 gms. Versonal, 8 gms. Sod. Acid Pyrophosphate. | .25 | 2.37 | Do. |

*Method of procedure.—*

(1) Collect a urine sample from animal and immediately medicate with one of the above complexing agents singly or in combination. The dosage consisted of 4 grams specific chelator, 8 grams specific sequestrant and 8 grams specific colloidal gum in each instant.

(2) Assay collected urine specimen immediately for chelation or complexing ability. THIS WAS DONE TO COMPARE ANIMALS NORMAL ABILITY AGAINST INCREASED OR DECREASED VALUE RESULTING FROM MEDICATION.

(3) Urine specimen were alkalinized with sodium hydroxide to a pH of 9 and filtered.

(4) 1 drop saturated solution ammonium oxalate solution per cc. urine eas added.

(5) Specimen was titrated to first permanent turbidity with calcium ion solution. (1 mg./cc. solution).

(6) Chelating or complexing ability determined by the amount calcium ion solution required to accomplish permanent turbidity.

2 to 4 hours later (1) Collect urine specimen from same animal so comparison can be made as to new chelation or complexing ability of urine post-treatment.

(2) Repeat assay procedure as outlines above for pretreatment.

*Conclusion.—*

(1) Many animals have a normal chelation or complexing ability in the urine which probably explains why all animals do not develop renal calculi.

(2) Chelators administered alone demonstrate some chelation or complexing ability in some animals but does not reach high enough concentration within the body processes to effectively accomplish dissolution aberrant cations.

(3) Phosphates administered alone seem to break down into the inactive ortho phosphate form, for the most part.

(4) Cross section of results which demonstrate synergistic, additive, or protective effect these complexing agents have with one another when orally administered to animals in combination of two or more complexing agents together or one and thence another is amply confirmed in compilation of data as exhibited in experiments 10 through 16 above.

EFFECT OF ORAL CHELATING AGENTS ON COMPLEXING POWER OF URINE

*Method.—*

Base line of normal chelating power of urine at different time intervals established 16 July on four people and one dog.

Three of same people and same dog given various chelating agents by mouth and urine specimen checked at intervals after treatment for chelating power. 20 July.

Same three people rechecked after taking same chelating agent 23 July.

Chelating power determined by adjusting pH of urine to about 9—filtered—5 cc. of filtered urine used in test. 5 drops saturated solution ammonium oxalate added and titrated to 1st permanent turbidity with calcium chloride solution containing 1 mg. calcium ion per ml. Results expressed in ml. calcium solution required to reach end point.

16 JULY, 1961

| Name | Medication | Hrs. after med., intervals of 2 to 3 hrs. | Chelating Pr. | Average |
|---|---|---|---|---|
| Dee (Child) | None | 2 to 3 hrs. | .46 .42 .08 .32 | .32 |
| H.A. | do | Same | .08 .28 .32 | .23 |
| D.O. | do | Same | .08 .32 .36 | .25 |
| Dog | do | One spec. only. | .14 | .14 |
| F.M. | do | 2 to 3 hrs. | .22 .22 .16 | .20 |

20 JULY, 1961

| H.A. | 3 gm.: Versenol 1.2 gm. Hex. 1.2 gm. CMC .6 gm. | 2 hrs. 4 hrs. 6 hrs. | .28 .34 .29 | .30 |
|---|---|---|---|---|
| D.O. | 3 gm.: Versene 1.2 gm. Hex. 1.2 gm. CMC .6 gm. | 2 hrs. 4 hrs. 6 hrs. | .28 .18 .26 | .28 |
| Dog | 3 gm.: Versenol 1.2 gm. Hex. 1.2 gm. CMC .6 gm. | 3 hrs. | .34 | .34 |
| F.M. | 3 gm.: Versene 1.2 gm. Poly 1.2 gm. CMC .6 gm. | 2 hrs. 4 hrs. 6 hrs. | .18 .32 .35 | .28 |

23 JULY, 1961

| H.A. | 3 gm.: Versenol 1.5 gm. Hex. 1.5 gm. | 2 hrs. 4 hrs. 6 hrs. | .60 .54 .18 | .44 |
|---|---|---|---|---|
| D.O. | 3 gm.: same as H.A. | 2 hrs. 4 hrs. 6 hrs. | [1].22 .08 .06 | .12 |
| F.M. | 5 gm.: Versenol 2.5 gm. Hex. 2.5 gm. Divided into two doses at 3 hr. intervals. | 2 hrs. 3 hrs. 4 hrs. 6 hrs. | .30 .26 .34 .54 | .36 |

[1] Developed diarrhea.

*Conclusions.—*

Human urine has normal chelating power. Young people seem to have more of this ability. The degree of chelating power varies from time to time during the day.

Oral administration of various chelating agents enhances the complexing power of both human and canine urine.

REPORT ON ONE CASE OF HUMAN RENAL PELVIC LITHIASIS (STAG HORN) TREATED WITH 1120–C

A 46 year old white female has suffered with chronic pyelonephritis for the past five years. About two and one-half years ago she began developing a right renal pelvic stone which has gradually grown into a typical stag horn calculus about the size of a lemon. For the past two years she has never been able to go more than ten days without antibiotic and at no time has been really well.

About the first of May she was started on 2 capsules (.5 gm. ea.) of 1120–C with each meal. She has experienced no side effects other than mild "heartburn." The really amazing result is that she has required no antibiotic since starting therapy although bacilluria and pyuria persist. X-ray shows no change in the size of the stone—but at least it is no larger. 1120–C=1 gm. EDTA, 1 gm. sodium tripolyphosphate, and 1 gm. carboxymethylcellulose.

REPORT ON EFFECT OF 1120–C ON BLOOD CHOLESTEROL IN ONE HUMAN SUBJECT

About three years ago a 49 year old white male suffered a coronary thrombosis at which time he was found to have a consistently elevated blood cholesterol of between 4–500 mlg. percent. He was placed on a low cholesterol diet and given various medications with little or no effect on his level.

On July 1, 1961, he was placed on 1 gm. 1120–C each meal. One week later his blood cholesterol was determined at 242 mg. percent, and on July 22, 1961, was found to be 283 mg. percent.

From this observation on one human subject it would appear that this preparation has properties capable of lowering blood cholesterol levels superior to the methods now in use. Certainly further evaluation of the material is imperative in view of the gravity of the problem.

With regard to the treatment of urinary calculi in animals, the following formulas have been found to be very effective:

Formula No. 1 (RX 1120–C): Grams
    EDTA [1] _____ 1
    Sodium tripolyphosphate [2] _____ 1
    Carboxymethylcellulose _____ 1
Formula No. 2:
    EDTA [1] _____ 1
    Sodium tripolyphosphate [2] _____ 1
    Poly-n-vinyl-5-methyl-2-oxazolidone ___ 1
Formula No. 3:
    EDTA [1] _____ ½
    Sodium tripolyphosphate [2] _____ 1
    Poly-n-vinyl-5-methyl-2-oxazolidone ___ ½
    Carboxymethylcellulose _____ 1
Formula No. 4:
    EDTA [1]
    Sodium tripolyphosphate [2] _____ 1.5
    Carboxymethylcellulose _____ .5

[1] Or n-hydroxyethyl EDTA.
[2] Or Sodium hexametaphosphate.

The agent that comes under the classification of colloidal carrier which we employ is carboxymethylcellulose. This is not a cation base exchange substance. Carboxymethylcellulose acts as an anion exchange substance as well as an absorber or a blocker of reactivity of cations with poorly soluble anions such as carbonates, sulfates, phosphates, oxalates, etc. It could be defined as a hydrophilic colloid with an action of keeping urinary crystalloids in solution, thus preventing aggregation of particles. It helps to keep sulfates in suspension, adds to water carrying capacity and would demonstrate some synergistic action with sodium tripolyphosphate. Colloidal carriers which can be used are sodium carboxymethylcellulose, potassium carboxymethylcellulose, potassium carboxymethylcellulose and general classification of non-istic cellulose gums.

The dosage range which is effective yet does not disturb the animal's feed consumption is Cattle—3 grams to 15 grams (1 day)
Sheep—1 gram to 6 grams (1 day)
Poultry—120 mgs. to 300 mgs. (1 day)
Cats—150 mgs. to 300 mgs. (1 day)
Dogs—450 mgs. to 4.5 grams (1 day)
Mink—270 mgs. to 300 mgs. (1 day)

Various weight combinations of chelates, chelating resins, colloidal carriers, may be used, administered in the ranges above according to the particular animal; and whether it is being used prophylactically or therapeutically. There materials are blended together. In actual manufacture, one may add two to seven grams inert carrier with each dose active ingredients. This could cause the finished product to be of a bulkier consistentcy making its administration easier. The finished product is administered to the animal by blending it into the animal's daily ration or by sprinkling it over the animal's feed. Dosing in the form of capsules, tablets, or parenteral administration might be desirable under certain circumstances.

For treatment of active urinary calculi cases, the larger dosage for the species involved would be indicated. On prevention, the smaller dosage for the species involved is indicated. A good ration adequately fortified with vitamins is also indicated.

To illustrate the novel effects of the above composition, a commercial trial of Formula No. 1 was conducted in a Central California Feed Lot. Five hundred and three head of steers were put at 5 grams per head, per day, for a period of three days. Before the cattle were put on Formula No. 1, one death from urinary calculi had resulted, sixteen cases of urinary calculi had been diagnosed, and two "dribblers" had been marked. At the conclusion of the three day trial, no cattle were showing signs of urinary calculi; the two "dribblers" showed no symptoms of urinary calculi; no new cases had developed. The steers ate the medicated feed readily and there were no apparent side effects.

The Formula No. 1 was used as a top dressing to regular feed after being mixed with sun cured alfalfa meal, dehydrated alfalfa meal, stabilized Vitamin A (250,000 units/head/day) plus a feed enthuser.

To further illustrate the effects of the above composition, the following experiments were undertaken:

TEST I

Date: August 11, 1960.
Breed: Hereford Steers.
Weight: 1200.
Age [1]: 18 months—2 years.
Sex: Steers.
No. of animals: 200.
History: Straining, inappetance, numerous granules on prepucial hairs. 75 out of 200 demonstrated granules on prepucial hairs.
Condition: Seven animals showing partial urethral obstruction. Two of the seven died.
Symptoms: Urine retention—distress.
Diagnosis: Urinary calculi. Deproponex (a mild muscle relaxant).
Therapy: Antibiotics used from September 16, 1960 to September 21, 1960. One Angus steer showing edema in abdominal wall. Trocar introduced into peritoneal cavity and drained. September 21, 1960, some here improvement but not satisfactory. At this time entire group animals placed on Rx 1120–C [2] in their daily ration.

[1] Average age of animals if more than one.
[2] Rx 1120–C is code for Formula #1.

Evaluation: 4–5 days following use of Rx 1120–C prepucial granules were disappearing. And the Angus steer in particular cleared and was on full feed with no apparent symptoms and no further complications. Steer finished out with no more trouble. After discontinuance of Rx 1120–C (4 days before marketing) prepucial granules began to reappear.

TEST II

Breed: Cat.
Sex: Male.
No. of animals: 1.
History: Cat entered and condition was diagnosed as urolithiasis. The animal was anesthetized and catheterized thus allowing free passage of urine from the bladder.
Therapy: The cat was administered 10 drops of Rx 1120–C calculi medicine daily and sent home with instructions to continue the therapy at home. The cat was entered two more times within the next week—each time it was necessary to pass a catheter in order to empty the bladder. Since then the cat has been doing fine and is able to pass his urine freely.
Evaluation: Additional treatment consisted of urised (a diuretic) administered at 2 pills morning and evening for 10 days.

TEST III

Breed: German shorthair.
Weight: 75.
Sex: Male.
No. of animals: 1.
History: Was treated for urethal calculi for 4 days. The urethra was flushed and the flow of urine was normal when the case was dismissed. Owner reported two days later that occasionally dog had difficulty urinating and then would pass a small calculus.
Diagnosis: Urethral calculi.
Therapy: 20 drops of Rx 1120–C Calculi medicine was administered daily. No more difficulty has been reported by the owner. In addition, urised (a diuretic) was administered at 2 pills morning and evening.
Duration of treatment (total number of days): 20 drops 1 day until bottle emptied.

TEST IV

Date: October 30, 1960.
Breed: Domestic cat.
Weight: 9.
Age: 1½ years.[1]

[1] Average age of animals if more than one.

Sex: Male.
No. of animals: 1.
History: Frequent urination with blood. Decrease in appetite.
Symptoms: Temperature 103.2. Sore abdominal region. Demonstrated pain when bladder was palpated. Small grains of sand at end of penis.
Diagnosis: Urinary calculi.
Therapy:
    1st day A.M. Jenatone tablet (a urinary muscle relaxant)
        P.M. Rx 1120–C—10 drops
    2nd day A.M. 10 drops Rx 1120–C
    3rd day A.M. 10 drops Rx 1120–C
    4th day A.M. 10 drops Rx 1120–C
Duration of treatment (total number of days): 7.
Evaluation: No recurrence of symptoms 11–28–60 still no further complications. Cat doing fine.

TEST V

Date: November 26, 1960.
Breed: Herefords.
Weight: 400 lbs.
Age: 5 months.[1]
Sex: Males.
No. of animals: 3.

[1] Average age of animals if more than one.

History: After weaning, calves were placed on bunker feeding of grains and alfalfa hay with corn silage. Most animals adjusted well, with no apparent indigestion. Three showed signs and developed rumen distention from gas formation. The bloat persisted and became chronic, requiring daily removal of the gas via stomach tube.

Condition: Animals lost weight due to chronic bloating, consequently they could not ingest enough nutrients to gain or maintain their weight.

Symptoms: Distended rumen, inappetence, gradual loss of weight.

Diagnosis: Chronic bloat (Tympanitis).

Therapy: Bloat relieved by tube and each animal given 5 grams 5 continuous days at 5 grams per day. 6th day animals were not bloating and appetites were improving. Mixed 2 grams Rx 1120–C in each animal's feed per day.

Evaluation: Animals making an uneventful recovery and are still on Rx 1120–C.

TEST VI

Date: October 14, 1960.
Breed: White faced sheep.
Weight: 77.
Age [1]: 8 months.
Sex: Male.
No. of animals: 12.
History: Took two lots of lambs of six each and placed in separate pens. Made two identical rations with the exception added Rx 1120–C to one group's ration which was designated lot No. 1. Group without Rx 1120–C was designed lot No. 2. Fed each lot of lambs 27 days. At time of termination of experiment, in lot one containing Rx 1120–C, 207 individual lamb eating days were noted. In lot two without Rx 1120–C, 199 lamb eating days were noted. Lot one consumed an average of 5.54 lbs. of feed per day. Lot two consumed an average 3.75 lbs. of feed per day.

Diagnosis: Note: Two lambs were sacrificed from each group 11/3/60. These were examined for pathogenicity. All were normal. One lamb from lot number 2 was sacrificed 11/19/60.

Evaluation: Rx 1120–C increased feed efficiency by .44 lb. per head per day in careful controlled lamb feeding experiment.

[1] Average age of animals if more than one.

TEST VII

Date: October 14, 1960.
Breed: Lambs.
Weight: 77 lbs.
Age: 8 months.
Sex: Males.
No. of animals: 12.

Experiments commenced in the following two lots of lambs, October 14, 1960.

HISTORY

| Lot #1 | Lot #2 |
|---|---|
| 11/2/60—Lambs seemed contented—no evidence of calciferous material on the hairs of prepuce. | 11/2/60—Noticed accumulation of calciferous material on the prepuce hairs on 4 lambs. Lambs were restless. |
| 11/3/60—Sacrificed two lambs of control study. Bladder of urinary tract were completely normal. Grade: 1—U.S. Choice. 1—U.S. Good. | 11/3/60—Sacrificed two lambs for urinary tract examination. Bladder exhibited cysts and was very thin walled. Urine contained 2% small stones. Grade: 1—U.S. Choice. 1—U.S. Good. 11/10/60—One lamb demonstrated dribbling urine excretion. It repeatedly kicked at its stomach. This lamb was sacrificed and the urinary tract inspected. Cysts were evident in the proximal portion of the urethra next to the bladder. Grade: U.S. Good. |

HISTORY—Continued

| Lot #1 | Lot #2 |
|---|---|
| 11/18/60—The balance of 4 lambs were sacrificed and the urinary tract examined. In each lamb the urinary tract appeared 100% normal. Grade: 3—Lambs U.S. Choice. 1—Lamb U.S. Prime. | 11/18/60—Balance of 3 lambs were sacrificed and urinary tracts inspected. Typical irritation cysts were evident in all three bladders. The upper end of the urethra showed signs of irritation. The urine contained 2% solids in the form of small stones. The Ph was 8. Grade: 3—Lambs U.S. Choice. |
| In Lot #1, the experiment consumed 207 individual lamb eating days. | In Lot #2, the experiment consumed 199 individual lamb eating days. |
| At time of slaughter, lambs weighted as follows: 11/3/60 (2 lambs)_____ 164 lbs. 11/18/60 (4 lambs)_____ 456 lbs. ———— 620 lbs. | At time of slaughter, lambs weighted as follows: 11/3/60 (2 lambs)_____ 178 lbs. 11/10/60 (1 lamb)_____ 80 lbs. 11/18/60 (3 lambs)_____ 300 lbs. ———— 553 lbs. |
| Ration: Alfalfa hay_____ 200 lbs. Beet Pulp, dried____ 300 lbs. Linseed Meal_____ 170 lbs. Oats_____ 150 lbs. Wheat_____ 150 lbs. Salt_____ 5 lbs. $K_2HPO_4$_____ 25 lbs. Rx 1120–C_____ 1 lb. ———— (Formula No. 1)____ 1,001 lbs. | Ration: Alfalfa hay_____ 200 lbs. Beef Pulp, dried____ 200 lbs. Linseed Meal_____ 170 lbs. Oats_____ 150 lbs. Wheat_____ 150 lbs. Salt_____ 5 lbs. $K_2HPO_4$_____ 25 lbs. ———— 1,000 lbs. |

Conclusion.—Lot #1: Bladders, urinary tract and urethra were normal in all lambs upon sacrificing. Rx 1120–C was effective in prevention of urinary calculi.

Conclusion.—Lot #2: Urinary calculi stones were demonstrated in the bladders of the lambs as they were sacrificed. Many cysts were evident in all bladders. The upper end of the urethra showed signs of irritation. The urine contained 2% solids in the form of stones.

Rx THERAPEUTIC NUTRITIONAL CASE HISTORIES

A. *Prevention of renal calculi in hereford steers by prophylactic administration of combinations of said agents*

Date: 6/7/61.
Breed: Hereford.
Weight: 500–550 lbs.
Age [1]: 10 months.
Sex: Male.
No. of animals: 2 pens of 60—one control and one treatment pen.
History: Feedlot has had a prior history of urinary calculi, approximately 1 to 3%. Steers had been on summer feed of about 1½ # barley, free-choice salt and mineral mix, plus all of the chopped alfalfa hay they could eat. (Alfalfa hay was imported from an area with a very high incidence of urinary calculi.)
Condition: Weanlings in good condition.
Symptoms: None.
Diagnosis: Program was carried on to prevent urinary calculi. One pen of 60 head was placed on a preventive ration and one pen of 60 was used as a control.
Therapy: 1st day [2]
  A.M. 17½ lbs. of Rx 1120–E was mixed in the feed (1 tons).
  P.M. and 1 pound of this was fed per head per day to pen #1. Pen #2 received no prophylactic medication.
Evaluation: Steers were acclimated for one week to feed. Four steers from Pen #2 were operated on, stones being removed from each. Sand-like material was removed from the urethra directly in front of the scrotum, with no further complications. Steers from Pen #2 were made into "heifers." There was no complication in Pen #1.

Composition Rx 1120–E:                               pounds
  Sodium tripolyphosphate _____ 7
  Ethylenediamine tetraacetic acid _____ 8
  Sodium carboxymethycellulose _____ 2.5

[1] Average age of animals if more than one.
[2] Duration of treatment (total number of days) 90 days.

Treatment of renal calculi in dogs by the therapeutic adminstration of these agents as well as the prevention of the re-occurance of renal calculi.

Date: December 28, 1960.
Breed: Dachshund.
Weight: 30 lbs.
Age: 3 years.
Sex: Female.
No. of animals: 1.
History: Recurrent cystic calculi. Lithotomy performed twice previously.
Condition: Chronic cystitis.
Symptoms: Hematuria, stranguary.
Diagnosis: Chronic cystitis, cystic calculi.
Therapy: 1st day (December 28, 1960).
    A.M. 10 gtts.[1]
    P.M. 10 gtts.
Duration of treatment: Still on treatment.
Evaluation: January 16, 1961—Powder preparation used in place of liquid. One teaspoonful daily mixed in the food. No return of previous symptoms since December 28, 1960.

[1] Composition:
    Sodium tripolyphosphate _____ grams__ 160
    Ethylenediaminetetraacetic acid _____ do____ 600
    Sodium carboxymethylcellulose _____ do____ 50
    Water q.s. _____ gallon__ 1

C. Treatment and prevention of renal calculi, cystitis and hematuria in cats Date: December 27, 1960.
Breed: Domestic cat.
Weight: 10 lbs.
Age: 2 years.
Sex: Male—castrated.
No. of animals: 1.
History: Intermittent urinary retention caused by urethral plugging, April 18, 1960, April 30, 1960, May 31, 1960, June 20, 1960, July 20, 1960, urethratomy July 28, 1960 and hospitalized to September 2, 1960.
Condition: Intermittent cystitis and hematuria.
Symptoms: Hematuria, urinary retention.
Diagnosis: Peptitis.
Therapy: 1st day (December 27, 1960) A.M., P.M. 5 gtts.[1]
Duration of treatment: Still on treatment.
Evaluation: This cat has not had symptoms of cystitis or urinary retention since December 27, 1960.

[1] Composition:
    Sodium tripolyphosphate _____ grams__ 160
    Ethylenediaminetetraacetic acid _____ do____ 600
    Sodium carboxymethylcellulose _____ do____ 60
    Water q.s. _____ gallon__ 1

D. Treatment of renal calculi in sheep

Breed: Lambs.
Weight: 77 pounds.
Age: 8 months.
Sex: Male.
No.: 6.
History: Noticed accumulation of calciferous material on the prepucial hairs on 4 lambs. Lambs were restless and kicked at abdomen.
Condition: Lambs showed partial urethral obstruction. Bladder extended, with some urine dribbling.
Symptoms: Urinary retention.
Diagnosis: Urinary calculi.
Therapy: 17½ # Rx 1120–C[1] mixed in feed plus administering two ¼ ounce capsules containing Rx 1120–C only once.
Evaluation: Within 3 days, prepucial granules had disappeared and animals were urinating normally. There was no further trouble and animals were marketed graded U.S. Choice.

[1] Composition: Rx 1120–C (equal parts sodium tripolyphosphate and ethylenediaminetetraacetic acid).

E. Fate of oral dosage of sodium tripolyphosphate in human urine

Samples:
    Before Urine: 10:20 A.M., color brown, 200 ml. vol. (Oral dosage 20 ml. 5% sodium tripolyphosphate (1 gram total) 10:30 A.M.)
    1st AFTER: 11:35 A.M. (65 min.), color yellow, 100 ml. vol.
    2nd AFTER: 12:05 (95 min.), color straw, 50 ml. vol.
    Lunch eaten
    3rd AFTER: 1:15 P.M. (2 hr. 45 min., colorless, 200 ml. vol.

PHOSPHATE IN URINE SAMPLES

|  | Total P | Ortho | Poly |
|---|---|---|---|
| BEFORE URINE | 420 | 480 | None. |
| 1st AFTER (65 min.) | 700 | 850 | Do. |
| 2nd AFTER (95 min.) | 800 | 800 | Do. |
| 3rd AFTER (2 hr. 45 min.) | 530 | 545 | Do. |

*Conclusion.*—Oral dosage of 1 gram of sodium tripolyphosphate resulted in an increase in orthophosphate in the urine with peak at 95 min. sample. There was no detectable polyphosphate in the urine. This suggests conversion of tripolyphosphate by stomach acids etc. to orthophosphate before assimilation. Comparing this result with previous demonstration of polyphosphate in urine following oral dosage with the formula, we feel this may be evidence for a protective action of EDTA on tripoly preventing conversion to ortho by the stomach acids and other digestive processes.

CHELATING ACTIVITY OF URINE SAMPLES

*Method.*—10 ml. of sample and 10 ml. of 2% sodium carbonate is examined for immediate precipitate; if clear, it is titrated with calcium acetate (1 ml.:1 mg. Ca).

|  | mg. Ca complexed/10 ml. | | Equivalent EDTA/10 ml. |
|---|---|---|---|
| BEFORE URINE | Ppt. forms | None | None. |
| 1st AFTER | do | do | Do. |
| 2nd AFTER | Clear | 0.8 ml | 5.2 mg./10 ml. |
| 3rd AFTER | do | 0.8 ml | 5.2 mg./10 ml. |

*Conclusion.*—In spite of failure of polyphosphate to show in the urine samples, a definite increase in capacity of the urine to hdd calcium carbonate in solution is demonstrated in the 2nd and 3rd AFTER samples. The chelating activity is equivalent to 0.5 mg. of EDTA per ml. which is very low. It may be due to a change in the mucroprotein complex normally present in urine; either quantitative or qualitative change toward greater ability to retain calcium in solution (probably magnesium as far as the urine itself goes).

F. Tentative estimation of EDTA in urine using copper complex technique

|  | Copper, p.p.m. | EDTA Acid Equiv., mg./100 ml. | Tot. Vol. Urine, ml. | Tot. EDTA, mg. |
|---|---|---|---|---|
| 3rd AFTER (3 hr.) | 9.84 | 46.24 | 109 | 50.4 |
| 4th AFTER (3:20) | 4.05 | 28.35 | 150 | 42.5 |
| 5th AFTER (4 hr.) | 3.79 | 17.81 | 139 | 24.7 |
|  |  |  |  | 117.6 |

G. Effect of formula on appearance of polyphosphate in urine

Formula:
    EDTA–$Na_3$, 8 parts, 16 gm., total volume 360 ml.
    Sod. tripoly, 7 parts, 14 gm., 1 gm. EDTA/20 ml.
    Carbose (carboxymethylcellulose), 1.5 parts, 3 gm.

*Method.*—Samples of human urine taken before and after oral dose of 20 ml. of formula (1 gm. EDTA).

Schedule:
    15 to 9 A.M.—BEFORE URINE.
    10 to 9 A.M.—ORAL DOSE FORMULA.
    10 A.M.—1st AFTER URINE (70 min. after oral dose).
    1:30 P.M.—2nd AFTER URINE (4 hr. 20 min. after oral dose).

| Phosphate Determinations | Total, p.p.m. | Ortho, p.p.m. | Poly, p.p.m. | Urine Vols., ml. | Total mg. Poly |
|---|---|---|---|---|---|
| BEFORE URINE | 760 | 600 | 160 | 85 | 13.6 |
| 1st AFTER URINE | 640 | 528 | 112 | 38 | 4.2 |
| 2nd AFTER URINE | 950 | 544 | 406 | 125 | 50.7 |

Basis for determining total mg. polyphosphate: Total phosphate minus ortho gives poly as parts per million or milligrams per liter. Calculate mg./ml. and multiply by volume in ml.

*Conclusion.*—A significant increase in polyphosphate appears in 2nd urine taken 4 hours after oral dose of formula.

A synergistic effect between polyphosphate and EDTA can be conjectured in which EDTA may act to lower the intake of calcium from the digestive tract (as its more important and obvious role) while tripolyphosphate may carry through to be the more active sequestering agent in the urine.

*H. Effect of EDTA on appearance of tripolyphosphate in urine*

Schedule:
    BEFORE URINE: 7:45 A.M., color brown, vol. 60 ml.
    7:45 A.M. oral dose: 20 ml. 5% EDTA and 20 ml. 5% sodium tripolyphosphate or 1 gram each.
    1st AFTER: 10:10 A.M. (2 hr. 25 min.), brown color, 140 ml.
    2nd AFTER: 11:10 A.M. (3 hr. 25 min.), yellow color, 60 ml.
    3rd AFTER: 11:40 A.M. (3 hr. 55 min.), colorless, 100 ml.
    Lunch
    4th AFTER: 1:30 P.M. (5 hr. 20 min.), yellow color, 140 ml.

FATE OF PHOSPHATE

| | Total, p.p.m. | Ortho, p.p.m. | Poly, p.p.m. |
|---|---|---|---|
| BEFORE | 480 | 540 | None |
| 1st (2 hr. 25 min.) | 760 | 760 | None |
| 2nd (3 hr. 25 min.) | 840 | 760 | 80 |
| 3rd (3 hr. 55 min.) | 640 | 560 | 80 |
| Lunch | | | |
| 4th (5 hr. 20 min.) | 1000 | 1000 | 80 |

*Conclusions.*—Appearance of 80 p.p.m. polyphosphate when EDTA and tripoly are taken together may be compared with previous test where no poly was found when tripoly was taken alone. Also tests in which poly was found consistently when CMC, tripoly and EDTA were taken together support the ability of the formula to aid in assimilation of tripoly without conversion to ortho, EDTA appears to protect tripoly from conversion to ortho and enable it to appear in urine as a sequestering agent. We consider 1 p.p.m. effective, in preventing scale formation.

CHELATING ACTIVITY 10 ml. sample (filtered where necessary to remove natural precipitates; in this case before, 1st and 4th samples were filtered) and 10 ml. 2% $Na_2CO_3$ and titrate with Ca acetate 1 ml.: 1 mg. Ca.

| | Ca, mg./10 ml. | EDTA Equivalent, mg./10 ml. |
|---|---|---|
| BEFORE | 0.3 ml | 3.0 mg./10 ml. |
| 1st | 0.6 | 6.2. |
| 2nd | 1.7 | 11.3 (0.113% EDTA). |
| 3rd | 1.3 | 13.4 (0.134% EDTA). |
| 4th | 0.6 | 6.2. |

Basis: 1 ml. Ca acetate: 1 mg. Ca: 10:358 mg. $Na_4$ EDTA.

*Conclusion.*—EDTA appears in the urine at a 0.1% concentration coincidental with appearance of 80 p.p.m. polyphosphate.

EVALUATION OF 1120 C AS AN ADDITIVE TO VITAMINS AND TRACE MINERALS IN THOROBRED HORSES TO POTENTIATE ANTI-ANEMIC AGENTS

History: Animals had been on a ration highly fortified with vitamins and trace minerals, containing recognized anti-anemic factors such as Iron, Cobalt, etc., for at least six months prior to testing.

Pre-treatment (Hemoglobin levels):
    5 year mare—May 27, 1961—15.2 gms./100 cc. blood; June 1, 1961—15.2 gms./100 cc. blood; June 9, 1961—14.8 gms./100 cc. blood.
    18 months colt—May 27, 1961—12.5 gms./100 cc. blood; June 1, 1961—12.5 gms./100 cc. blood; June 9, 1961—12.1 gms./100 cc. blood.

On June 10, 1961, 1120 C was added to horses ration with all other factors remaining the same.

Post-treatment (Hemoglobin levels):
    5 year mare—July 21, 1961—17.7 gms./100 cc. blood.
    18 months colt—July 21, 1961—14.5 gms./100 cc. blood.

*Observations.*—Both animals have gained considerable weight on the same ration and appear in excellent physical condition. Take the 1120 C readily on their grain.

EFFECT OF INTRAVENOUS 1120-C AND 1120 VH ON CHELATING POWER OF DOG URINE

*Method.*—A sterile 5% solution of sodium hexametaphosphate with 0.2% versenol was given intravenously to one dog, and a 5% solution of sodium tripolyphosphate with 0.2% versene was given intravenously to another dog. Chelating power of pre-treatment urine and post treatment urines were determined as outlined below.

Urine was alkalinized to a pH of about 9, urine filtered and 5 ml. of the filtered urine was used as test material. Five drops saturated ammonium oxalae was added and then titrated with calcium chloride solution containing 1 mg. calcium ion per ml. to first permanent turbidity. Results expressed in ml. calcium solution required.

Dog #1 (wt. 45 lbs.) medication: 100 cc. 1120 VH (5 gm. sodium hexametaphosphate and 0.2 gm. versenol).

Dog #2 (wt. 13 lbs.) medication: 25 cc. 1120-C (1.25 gm. sodium tripolyphosphate and 0.5 gm. versene).

| | Pre-treatment | 2 hr. post Rx | 24 hr. post Rx | 48 hr. post Rx |
|---|---|---|---|---|
| Dog. #1 | .17 ml | 2.10 ml | .24 ml | .34 ml |
| Dog. #2 | .23 ml | 1.37 ml | .20 ml | .20 ml |

*Results.*—Both dogs exhibited typical hypocalcemia tetany.

Dog #1 recovered spontaneously on stopping the intravenous preparation, but Dog #2 required intravenous calcium to relieve the condition. Both dogs were apparently completely well and uneffected as soon as the tetany was relieved.

BLADDER STONES IN DOG

History: 3 year old female Pekingese dog was presented demonstrating straining, inappetance, and difficulty in voiding urine. Voided urine was bloody in appearance. Animal had three previous cystotomies for the removal of urinary stones accumulated in the bladder; the last one being 6 months earlier in this clinic. Chemical analysis of these stones revealed a composition of magnesium ammonium phosphate.

Diagnosis: Urinary stones accumulation in the bladder. X-ray of the bladder demonstrated a heavy significant deposit of aberrant cations within the bladder.

Therapy: Animal medicated with 40 drops Rx 1120–C [1] daily from June 14, 1961 to July 8, 1961. X-ray taken June 26, 1961, revealed some diminution in quantity of stones. On July 8, 1961, therapy was changed to Rx 1120–VH [2] capsules administering two grams daily. Within two days, urine appeared normal. Two weeks later, July 21, 1961 another X-ray was taken. This plate revealed approximately 2/3 the number of stones visible in earlier X-rays were now dissolved with composition subsequently eliminated.

Evaluation: The Rx 1120–VH capsules appear to have a very significant dissolving action on bladder stones composed of magnesium ammonium phosphate when such capsules are taken by mouth. This material has demonstrated a significant effect on the overall health of the animal. She has put on weight and visibly has never been in better health.

Conclusion: Rx 1120–VH when administered by mouth is effective in dissolving aberrant cations when such cations are deposited in the bladder of dogs and are composed of magnesium ammonium phosphate. It is my opinion, continued therapy utilizing Rx 1120–VH on this dog will effectively eliminate all of the aberrant cation deposits in this animal's bladder.

[1] Rx 1120–C—Formula #1.
[2] Rx 1120–VH—Versonal and sodium hexametaphosphate.

Chelating power of urine was increased 1235% in Dog #1 and 595% in Dog #2 two hours after treatment. Chelating power had dropped back to normal 24 hours later.

*Conclusions.*—Chelating power of dog urine can be greatly enhanced by intravenous administration of chelating agents. The term "animals" as used above includes warm-blooded mammals.

As this invention may be embodied in several forms without departing from the spirit or essential characteristics thereof, the present embodiment is therefore illustrative and restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A method of controlling and treating renal calculi in animals comprising, administering to said animals orally a composition comprising an effective quantity of diethylenetriaminetetraacetic acid and sodium tripolyphosphate.

2. A method of controlling and treating renal calculi in animals comprising, administering to said animals orally a composition comprising an effective quantity of ethylenediaminetetraacetic acid and S.Q. phosphate.

3. A method of controlling and treating renal calculi in animals comprising, administering to said animals orally a composition comprising an effective quantity of ethylenediaminetetraacetic acid and sodium hexametaphosphate.

4. A method of controlling and treating renal calculi in animals comprising, administering to said animals orally a composition comprising an effective quantity of N-hydroxyethylethylenediaminetetraacetic acid and sodium hexametaphosphate.

5. A method of controlling and treating renal calculi in animals comprising, administering to said animals orally a composition comprising an effective quantity of N-hydroxyethylethylenediaminetetraacetic acid and sodium acid pyrophosphate.

6. A method of controlling and treating renal calculi in warm-blooded mammals comprising, administering to said mammals orally a composition comprising an effective quantity of diethylenetriaminetetraacetic acid and sodium tripolyphosphate.

7. A method of controlling and treating renal calculi in warm-blooded mammals comprising, administering to said mammals orally a composition comprising an effective quantity of ethylenediaminetetraacetic acid and S.Q. phosphate.

8. A method of controlling and treating renal calculi in warm-blooded mammals comprising, administering to said mammals orally a composition comprising an effective quantity of ethylenediaminetetraacetic acid and sodium hexametaphosphate.

9. A method of controlling and treating renal calculi in warm-blooded mammals comprising, administering to said mammals orally a composition comprising an effective quantity of N-hydroxyethylethylenediaminetetraacetic acid and sodium hexametaphosphate.

10. A method of controlling and treating renal calculi in warm-blooded mammals comprising, administering to mammals orally a composition comprising an effective quantity of N-hydroxyethylethylenediaminetetraacetic acid and sodium acid pyrophosphate.

References Cited by the Examiner

UNITED STATES PATENTS

| | | | |
|---|---|---|---|
| 2,658,078 | 11/1953 | Blase | 260—559 |
| 2,698,823 | 1/1955 | Bersworth | 167—68 |
| 2,740,689 | 4/1956 | Easton | 8—111 |
| 2,875,129 | 2/1959 | Bersworth | 167—55 |
| 3,088,868 | 5/1963 | Windsor | 167—55 |
| 3,184,381 | 5/1965 | Asmead | 167—53 |

OTHER REFERENCES

Clarke: Am. J. of Med. Science, December 1956, volume 232, No. 6, pages 654–666.

Chem. Abst., vol. 34, p. 1077(3).

Chem. Abst., vol. 44, p. 10182(c).

Chem. Abst., vol. 47.

Abehouse: Chem. Abst., vol. 47, 1953, page 8240(i) and 8241(a).

Chem. Abst., vol. 47, p. 10103(b), 1953.

Chem. Abst., vol. 49, p. 4236(e), 1955.

Chem. Abst., vol. 49, p. 16098(f), 1955.

Chem. Abst., vol. 49, p. 4883(h), 1955.

Chem. Abst., vol. 50, p. 479(a), 1956.

Chem. Abst., vol. 54, p. 4207(d), 1960.

Chem. Abst., vol. 55 p. 11674(c), 1961.

Merck: Chem. and Eng. News, vol. 37, Advertisement August 10, 1959, p. 32.

Eisner, J. of Pharmacol and Exptl. Therapeutics, vol. 108, August 1953, pages 442-449.

Martin: Proc. Soc. Exptl., Brit. Med., vol 82, No. 3 March 1953, pages 373–375.

Abington: U.S. Armed Forces, Med. J., July 1958, pp. 987–91.

Versene: Technical Bulletin No. 1, Bersworth Co., 1949, page 11.

Sequestrene, Geigy, 1952, page 33.

JULIAN S. LEVITT, *Primary Examiner.*

MORRIS O. WOLK, FRANK CACCIAPAGLIA, *Examiners.*

P. SABATINE, S. ROSEN, *Assistant Examiners.*